No. 658,872. Patented Oct. 2, 1900.
H. E. S. SINGLETON.
FOCUSING DEVICE FOR CAMERAS.
(Application filed Sept. 27, 1899.)
(No Model.)
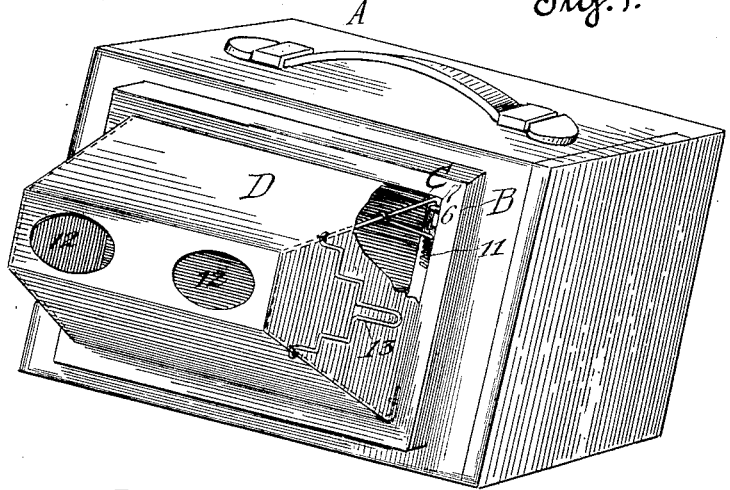
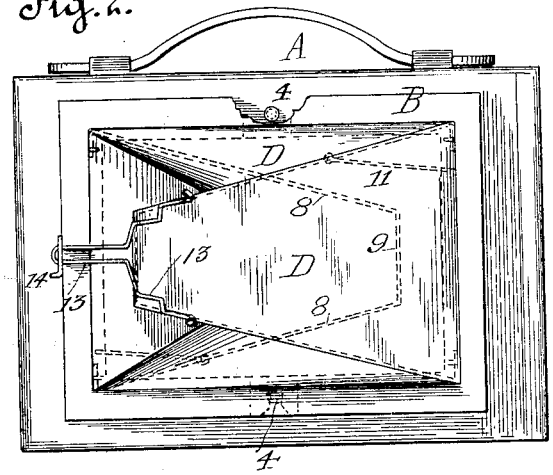
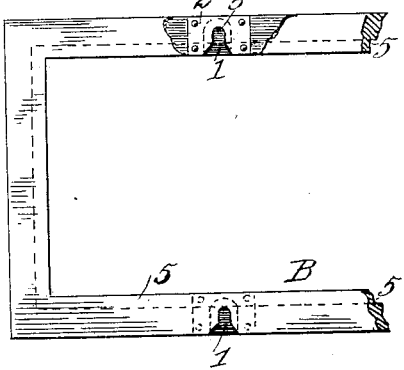
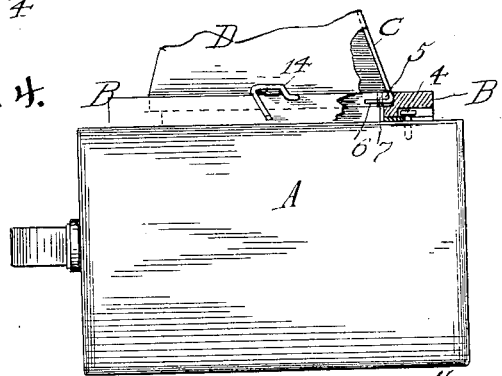
Witnesses.
Inventor.
Herbert E. S. Singleton
by Spear Seely
Attorneys

UNITED STATES PATENT OFFICE.

HERBERT E. S. SINGLETON, OF SAN FRANCISCO, CALIFORNIA, ASSIGNOR, BY DIRECT AND MESNE ASSIGNMENTS, OF ONE-HALF TO SIDNEY F. LEE AND HARRY HAMPSHIRE, OF SAME PLACE.

FOCUSING DEVICE FOR CAMERAS.

SPECIFICATION forming part of Letters Patent No. 658,872, dated October 2, 1900.

Application filed September 27, 1899. Serial No. 731,844. (No model.)

*To all whom it may concern:*

Be it known that I, HERBERT E. S. SINGLETON, a citizen of the Colony of Victoria, residing at San Francisco, in the county of San Francisco and State of California, have invented certain new and useful Improvements in Focusing Attachments for Cameras, of which the following is a specification.

My invention relates to an attachment for photographic cameras to be used in focusing.

My object is to do away with the inconvenient focusing-cloth heretofore generally used and at the same time to provide a light, simple, and cheap attachment in lieu thereof which is readily attachable and removable.

I have embodied my invention in a mechanical structure, which is illustrated in the accompanying drawings.

Figure 1 is a perspective view of a camera with my focusing attachment in position for operation. Fig. 2 is a rear elevation of the camera with the focusing device folded flat, as when not in use. Fig. 3 is an elevation of the frame which supports the focusing attachment with the cloth and its foldable supports removed and showing one means of attaching such frame to the camera. Fig. 4 is a side elevation of the camera with the focusing device partly broken away and partly in section.

A represents a camera of any ordinary kind, which in itself forms no part of my invention.

B is a frame, of wood or light metal, which is removably attached to the rear of the camera in any suitable way. I prefer the attachment illustrated in Figs. 3 and 4. The upper and lower bars of the frame are recessed, as shown at 1, and a plate 2, also recessed, as shown at 3, is countersunk in and secured to the lower surface of the frame, so that said recesses register. These recesses are caused to engage with the projecting screws or pins 4 4 on the camera, the heads of which pass behind the plates 2. In this way the frame is easily detachable, but is firmly held until positively removed. The face of the frame is rabbeted, as shown at 5, throughout its extent. In this rabbet or groove and at each end of the frame is hinged a foldable support C, which may be made of light wood or sheet metal, but is shown as formed from wire bent into proper shape. The two ends of each foldable support shown are turned up to form journals 6, which have bearings in staples 7, sunk in the groove, as shown very clearly in Figs. 1 and 4. Each support is bent so as to form two converging arms 8 8, connected at obtuse angles by a straight arm 9.

The two supports combined form a foldable frame, which is covered with suitable opaque material, preferably black cloth, the latter being secured at the edges in the rabbeted groove and stretched over the die-frames in the frusto-pyramidal shape shown in Fig. 1. Each support is thrown outwardly either by being formed as a spring or by being impelled by a spring 11, which connects it with the frame, so that when free the whole framework and its cover D assume the position of Fig. 1 and appear as a hood projecting from the rear of the camera and provided with the eyeholes 12 12. When not in use, the supports, with their flexible covering, are folded down one upon the other, so as to lie flat upon the frame and rear surface of the camera. In this position they are held in any suitable way. A convenient holding and releasing device is shown in the drawings, consisting of a bail 13, hinged upon one of the foldable supports, which when the device is in folded position projects slightly beyond the frame and is held by a latch 14, pivoted on the frame. When this latch is released, both foldable supports spring outwardly to the extent permitted by the cloth and form the focusing-hood illustrated. This hood answers all the purposes of the old focusing-cloth in excluding light and obviates all its inconveniences in being always at hand and instantaneous in adjustment for use. In fact, it need never be removed from the camera; but if occasion arises such removal can be made instantaneously. Where the camera is provided with a door at the rear controlled by a spring on the camera-box, there is ample room within the hood for such door to swing down out of the way.

I do not limit myself to the details of construction herein described, and shown in the drawings, as I desire to avail myself of such modifications and equivalents as fall properly within the spirit of my invention.

It will be seen that the folding supports are each of such length as to extend substantially all the way across the opening in the frame B, and in folding the hood the movement of these supports causes the hood to fold beneath them in the form of two superimposed or overlapping flaps. The hood is thus distinguished from the bellows or accordion form of folding hood in that it comprises the two flaps, each of which is of a length equal to that of the depth of the hood. The fastening device 13 for holding the hood in folding position is conveniently attached to the free end of one of the folding supports.

Having thus fully described my invention, what I claim as new therein, and desire to secure by Letters Patent, is—

1. In a focusing attachment for cameras, the combination with a frame adapted to be attached to a camera, of foldable supports pivoted to said frame and adapted to be folded one upon the other in flat position, a cover supported thereby, a bail connected to one of said supports and a latch for holding the free end of said bail.

2. In a focusing attachment for cameras, a frame having a groove or rabbet, a flexible cover secured therein, and spring-actuated foldable supports movable automatically toward the rear for expanding said cover into a focusing-hood.

3. In combination, the frame, the pivoted folding supports, the hood attached thereto and the spring for swinging said supports on their pivots, substantially as described.

4. In combination, the frame, the swinging supports attached at opposite sides of the frame, and arranged to overlap when folded, and a hood attached to the supports and forming, when folded, flaps extending inwardly from opposite sides of the frame and overlapping each other, substantially as described.

5. In combination, the frame, the overlapping pivoted supports, the hood attached thereto and the fastening device to hold the hood folded, said device being connected at or near the free end of one of the flaps, substantially as described.

In testimony whereof I have affixed my signature, in presence of two witnesses, this 18th day of September, 1899.

HERBERT E. S. SINGLETON.

Witnesses:
L. W. SEELY,
C. H. SINGLETON.